United States Patent Office 3,273,975
Patented Sept. 20, 1966

3,273,975
PRODUCTION OF CHLORODIFLUORAMINE
Mervin D. Marshall, Fombell, Pa., assignor to Callery Chemical Company, Pittsburgh, Pa., a corporation of Pennsylvania
No Drawing. Filed July 7, 1960, Ser. No. 41,444
1 Claim. (Cl. 23—356)

This invention relates to a new and improved method for the production of chlorodifluoramine, $ClNF_2$.

The object of this invention is to provide a new method for producing chlorodifluoroamine in which this compound is produced directly from dinitrogen tetrafluoride, $N_2F_4$, without the necessity of utilizing difluoramine, $HNF_2$, as an intermediate as is done in other methods for its production.

The above object is achieved by my invention through the reaction of dinitrogen tetrafluoride with sulfur dichloride, $SCl_2$. This reaction is straightforward and produces chlorodifluoramine as a volatile product which can easily be recovered by conventional techniques, such as by fractional distillation or condensation.

The temperature at which the reaction is carried out is not critical to its operability. Ordinary ambient temperatures, i.e. about 20 to 30° C., are most easily used and the reaction at such temperatures has been successfully practiced. For convenience, however, since both reactants are volatile my general practice has been to mix the reactants at low temperatures and then warm the mixture to ambient temperature whereby the reaction takes place to produce the desired product.

To exemplify the method of my invention, in one test thereof, one millimol of dinitrogen tetrafluoride was condensed into a glass reaction flask in which had been placed 1.5 milliliters of sulfur dichloride. The vessel was then allowed to warm to room temperature and the contents were stirred for four hours. The resulting mixture was then fractionally distilled at low temperatures. The lowest boiling fraction, upon analyses, was shown to be chlorodifluoramine, $ClNF_2$.

In these and other tests the efficacy of the reaction has been demonstrated and it has been shown that the yields of chlorodifluoramine are higher when somewhat longer reaction periods are employed.

Chlorodifluoramine is an excellent and quite reactive intermediate for the production of difluoramino-substituted compounds. For example, it can be used to make 1-chloro-2-difluoraminoethane by reaction with ethylene. Moreover, chlorodifluoramine is a good additive for use in conjunction with known oxidizers. When added to such oxidizers, it imparts properties associated with its fluorine constituent to the mixture produced, thereby giving the mixture more desirable properties. Thus, for example, it can be used as an additive to hydrogen peroxide and the mixture thereby produced is used in the same manner and in conjunction with the same fuels and engines as is hydrogen peroxide itself presently employed.

According to the provisions of the patent statutes, I have explained the principle and mode of practicing my invention and have described what I now consider to be its best embodiments. However, I desire to have it understood that, within the scope of the appended claim, the invention may be practiced otherwise than as specifically described.

I claim:
A method of producing chlorodifluoramine, $ClNF_2$, which comprises reacting dinitrogen tetrafluoride, $N_2F_4$, with sulfur dichloride, $SCl_2$, and recovering the chlorodifluoramine thus formed.

No references cited.

OSCAR R. VERTIZ, *Primary Examiner.*

ROGER L. CAMPBELL, R. D. MORRIS, M. WEISSMAN, *Examiners.*